United States Patent [19]

Hars et al.

[11] 4,185,879

[45] Jan. 29, 1980

[54] SHAFT-SUPPORTING MEANS, ESPECIALLY FOR PRINTING APPARATUS

[75] Inventors: Christoph Hars; Klaus Schirrich; Bodo Steinmeier, all of Bielefeld; Wilfried Tappe, Herford, all of Fed. Rep. of Germany

[73] Assignee: Fischer & Krecke, Bielefeld, Fed. Rep. of Germany

[21] Appl. No.: 911,005

[22] Filed: May 30, 1978

[30] Foreign Application Priority Data

Jun. 3, 1977 [DE] Fed. Rep. of Germany ....... 2725033

[51] Int. Cl.² ............................................. F16C 13/00
[52] U.S. Cl. ..................................... 308/20; 101/182; 308/22; 308/58
[58] Field of Search ........................ 308/15, 20, 22, 27, 308/31, 32, 33, 58, 59, 73; 101/182, 184, 185, 247

[56] References Cited

U.S. PATENT DOCUMENTS

| 2,639,199 | 5/1953 | Patrosio | 308/59 |
| 2,965,920 | 12/1960 | Whittum | 308/58 |

*Primary Examiner*—Charles E. Frankfort
*Attorney, Agent, or Firm*—Pollock, Vande Sande & Priddy

[57] ABSTRACT

A device for supporting a shaft, e.g., for the pressure roller of a printing machine, which is subjected to radial impact forces and which is slightly adjustable between a working position and a rest position. The shaft bearings are carried in bearing jewels guided in the bore of a fixedly arranged bearing block with the aid of a guide bolt. Two support surfaces for the bearing jewels are inclined relative to a plane which is perpendicular to the direction of adjustment of the shaft, and are pressed against corresponding support surfaces on the bearing block when the shaft is in working position.

14 Claims, 10 Drawing Figures

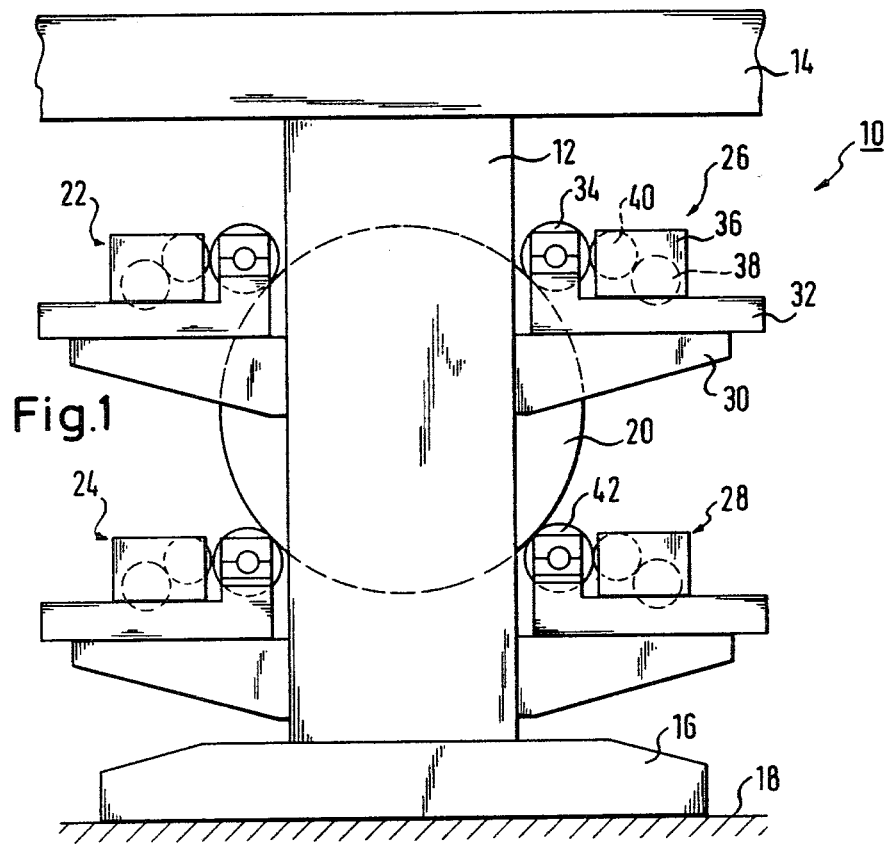
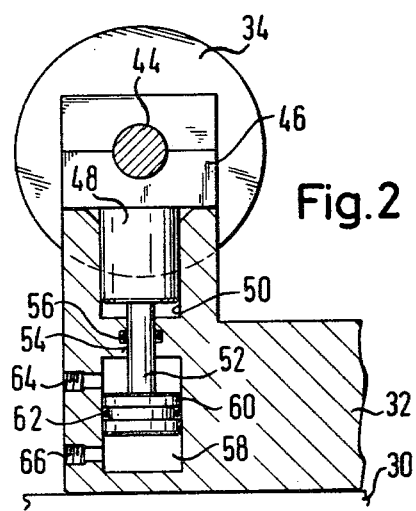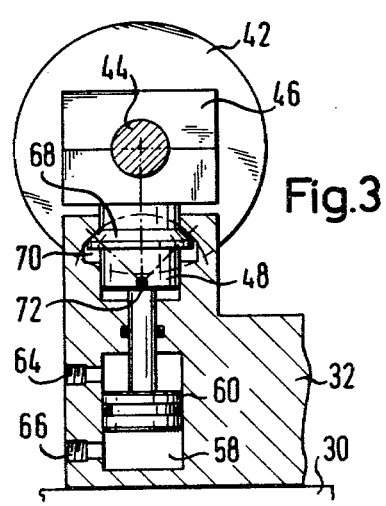

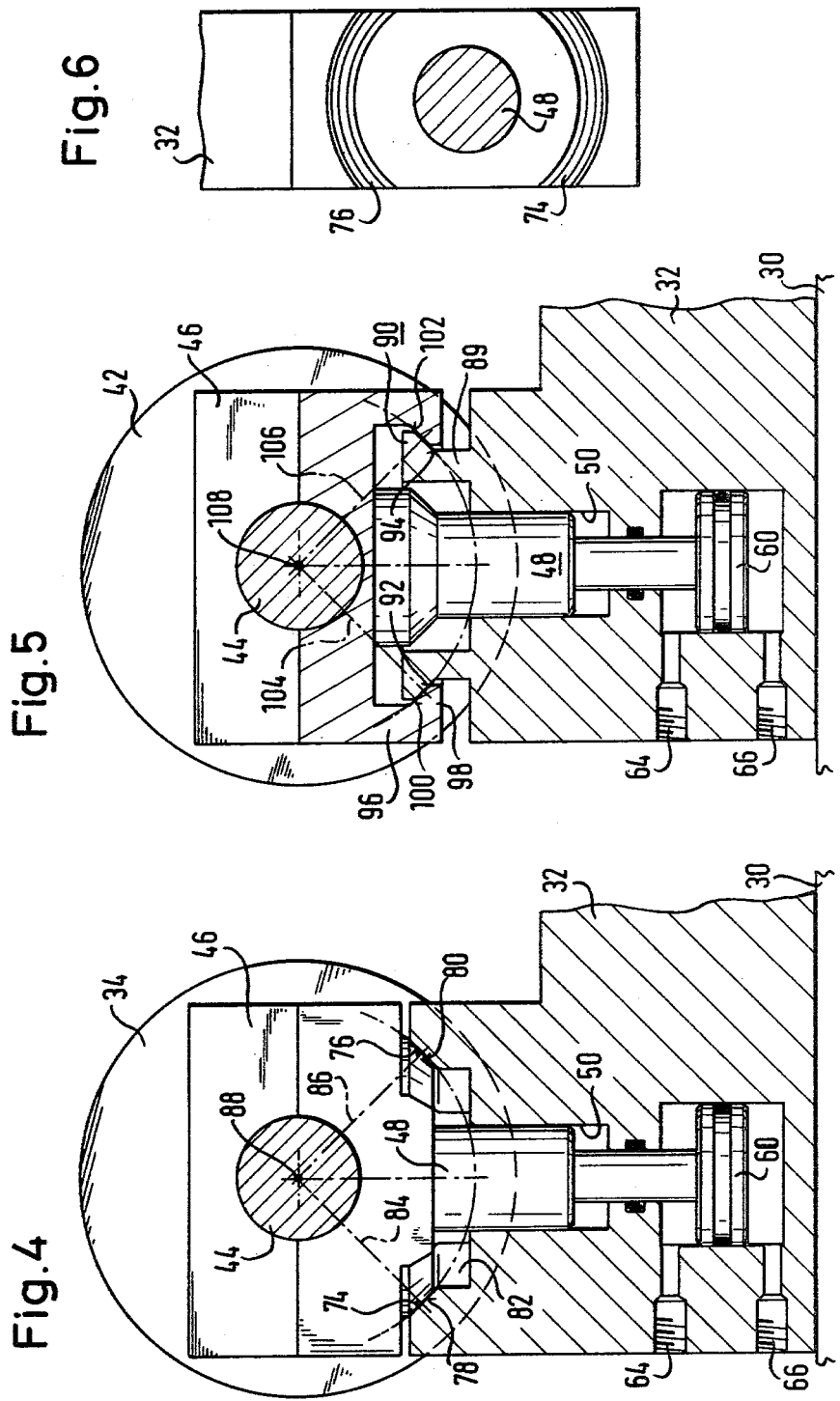

SHAFT-SUPPORTING MEANS, ESPECIALLY FOR PRINTING APPARATUS

SUMMARY OF THE INVENTION

The invention concerns means for supporting a shaft subjected to radial impact forces and slightly adjustable in a radial direction between a working position and a rest position, with two bearing jewels each carrying a shaft bearing and guided, with the aid of an axially displaceable guide bolt, in a bore of a fixedly arranged bearing block, each bearing jewel being provided with two opposed support surfaces inclined with respect to a plane perpendicular to the adjustment direction, which support surfaces can be pressed against corresponding support surfaces of the bearing block in working position.

BACKGROUND OF THE INVENTION

To date, such a device has been used, for example, for the precise and shock-resistant support of a working roller, especially of a pressure cylinder in a Flexo-rotary-printing machine. The support surfaces that are pressed against each other in working position, especially shaped as truncated cones, serve as a stop and for centering during precise positioning in working position. This precise positioning and simultaneous positive support of a pressure cylinder in relation to a counter-pressure cylinder is particularly important, since it is unavoidable in printing that impact forces in radial direction of the printing cylinder are exerted upon it. These, however, must be eliminated, since displacements of the order of magnitude of even a few hundredth millimeters affect the printed image.

In its working position, the pressure cylinder is in contact with the counter-pressure cylinder on the one hand, and with a color application roller on the other hand. During interruptions of the printing, it is necessary to pull back the pressure cylinder from the line between the color application roller and the counter-pressure cylinder, so that the plates of the pressure cylinder are separated from the color application roller and the path of the material feeding across the counter-pressure cylinder. When printing recommences, the pressure cylinder is against pushed forward into working position and must return precisely to the position it held prior to the interruption of printing, as transitory and inking errors will occur.

In the case of printing machines with several printing cylinders, in which either each printing mechanism has its own counter-pressure cylinder, or several printing cylinders are used with a common counter-pressure cylinder, it is also general practice to withdraw the pressure cylinders from contact with the counter pressure cylinder or cylinders during work interruptions. In the case of printing machines with one counter-pressure cylinder, this makes it necessary for the lower printing cylinders to be lifted into working position, while the upper printing cylinders must be lowered into working position.

In the case of prior art bearing arrangements of the type to be discussed, in which the printing cylinder is pulled back into the working position, it was initially common to retract the bearing jewel against a plane stop-surface of the bearing block in the working position. In this construction, shearing loads could be absorbed only by frictional forces between the stop surfaces of the bearing block and bearing jewel, and by support of the guide bolt in the bore of the bearing head. Because of the play necessary for the displacement of the printing cylinder between guide bolt and bore, deflection of the system was possible. Beyond this, the solution is not applicable wherever the printing cylinder must be moved into working position from the bearing block.

It has thus become common practice to provide the guide bolt of the bearing jewel with an exterior cone which, upon outward movement of the bearing jewel, comes to abut against an interior cone fastened on the bearing block around the guide bolt. This results in centering and positioning of the printing cylinder bearing, and hence the printing cylinder. A disadvantage of this construction is that, here too, impact and pressure forces exerted on the printing cylinder must be compensated for primarily by reaction-impact forces in the conical surfaces. For the purpose of supporting the printing cylinder, therefore, the sliding guide bolt can also be loaded. In the case of impact forces from changing directions, unavoidable in printing machines since the plates of the printing cylinder abut against both the path of the material at the counter pressure cylinder, and against the color application roller, play in the bearing of the guide bolt in the bore of the bearing block can increase in an undesirable manner.

The disadvantage of this prior art construction can be explained as follows: The arrangement of the conical seating surfaces permits, upon influence of radial forces on the printing cylinder, an at least approximate rotational movement about an instantaneous center located at the point of intersection of the mid-vertical of the cone surfaces. During such a rotation, assuming that, because of the very slight displacement paths, the conical seating surfaces can be considered to be spherical surfaces, pure displacement movements occur in the conical seating surfaces, so that merely frictional forces and not substantially more advantageous normal forces are available for the absorption of the shock stresses of the printing cylinder. The guide bolt therefore continues to be loaded by lateral forces, causing a displacement of the guide bolt in its guide. This condition will be further discussed below.

The object of the invention is a device of the type initially described, in which the radial forces exerted upon a shaft are absorbed not by frictional forces or by the loading of a guide that is necessarily provided with play, but primarily through normal forces. The guide bolt should conceivably be loaded in pull- or push-direction in order to produce high preload tension which forces the support surfaces against each other.

This problem is solved, according to the invention, by locating the center axis of the shaft within the smaller angle formed by the support surfaces of the bearing jewel.

The result of this solution is that the instantaneous center of a pure push-movement in the support surfaces, and the rotational axis of the shaft which is impact-stressed in the radial direction, are located on the same side of the support surfaces and, especially, even coincide. In the latter case, impact stresses cannot produce a displacement movement in the support surface, since the forces to be absorbed in the support surfaces impact the latter perpendicularly, so that the resulting impact forces can be absorbed by pure normal forces. The occurring impact forces can conceivably cause the bearing jewel to be raised from the support surfaces of the bearing block in a direction perpendicular to said surfaces. This normal movement can, however, be readily suppressed by a suitable pretensile force which is calculated to be, even in the case of extreme impact loads, greater than the forces tending to lift the bearing jewel. To produce such a pretensile force, only push- or pull-loading of the guide bolt is required, so that there is no danger of its guide being deflected.

An advantageous and rather simply executed embodiment of the support surfaces is a conical seat with straight surface lines. The surface lines need not, however, necessarily be straight; curved lines, for example circular arc lines, can also be considered. The conical seat also need not be formed as a closed circle, but can be limited to circular sections in the loading directions, since loads in the longitudinal directions of the printing cylinder practically never occur and the dimensions of the seat thus can readily be shortened in this manner.

Further, the support surfaces can have a multicornered or polygonal basic form that can also be formed only in the loading directions. A gable-shaped arrangement of the support surfaces is also possible, their contour lines preferably extending parallel to the shaft axis.

If the contour line of the support surfaces represents a doubly open multi-cornered form, an intercept line of the average vertical planes comprising a plurality of partially straight lines is produced and can be so designed that it will intersect the shaft axis at least once. At the same time it is assured that there is no instantaneous axis which is parallel to the shaft axis within a pure push-movement.

The stability of the bearing vis-a-vis impact forces increases with the vertical component of the intercept line of the mid-vertical planes. It is desirable but not necessary that the vertical component of this intercept line intercept the shaft axis, because there is no push-instantaneous axis which is parallel to the shaft axis.

In addition to the slanted support surfaces, it is possible to use further, adjoining support surfaces which extend in the opposite direction with respect to the plane which is perpendicular to the shaft axis. This results in a prismatic guide. It is also possible to arrange several such prismatic guides side by side. In this manner, several intersecting axes of mid-vertical planes are produced, effecting reciprocal displacement blockage in the support surfaces.

Other variations are possible, the only important requirement being that the shaft axis, which is stressed by radial impact forces, remain within the smaller of the angles formed by two support surfaces, so that the impact forces can be substantially absorbed by normal forces.

BRIEF INTRODUCTION TO THE DRAWINGS

Several preferred embodiments of the invention will now be explained with reference to the accompanying drawings, in which:

FIG. 1 is a schematic side view of a four-color Flexo-rotary press with a counter-pressure cylinder;

FIG. 2 is a schematic section through a known pressure cylinder stopping device with a printing cylinder that is pulled downward into its working position;

FIG. 3 shows a known printing cylinder stopping device with a printing cylinder that is lifted upward into its working position;

FIG. 4 is a printing cylinder stopping device according to the invention with a printing cylinder that is pulled downward into its working position;

FIG. 5 shows a printing cylinder stopping device according to the invention for a printing cylinder that is pushed upward into its working position;

FIG. 6 is a schematic partial plan view of the print cylinder stopping device according to the invention;

DESCRIPTION OF PREFERRED EMBODIMENT

Figure 7:
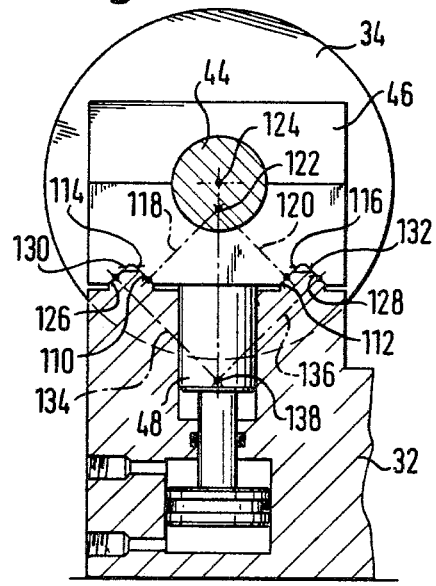
FIG. 7 shows a further embodiment of the invention with a printing cylinder that is pulled downward into its working position.

A Flexo-rotational printing machine generally designated as 10 in FIG. 1 comprises two side-by-side frames 12, shown standing behind each other in FIG. 1, connected to each other by an upper cross head structure 14 and supported on floor 18 by means of pedestals 16. Supported within frames 12 (in a manner not shown) is a counter-pressure cylinder which cooperates with four printing arrangements 22, 24, 26, 28 arranged at substantially equal angular distances about said counter-pressure cylinder 20. Since the printing arrangements are essentially the same and only designed in laterally-inverted fashion, only printing arrangement 26 shown in the upper right of FIG. 1 will be explained in detail, and reference will be made to the printing arrangement below it only with respect to differences.

Printing arrangement 26 is fastened to consoles 30 attached to frames 12. On console 30, there is a printing cylinder bearing block 32, displaceable to the right and left (in FIG. 1), and having a printing cylinder 34 mounted therein. Attached to the bearing block 32 is an inking device support 36 which essentially comprises a dipping roller 38 and a color application roller 40. Inking device support 36 is movable to the left and right (in FIG. 1) on bearing block 32. Details of this construction are known and will therefore not be further discussed.

The printing arrangements 26 and 28 shown at the right in FIG. 1 merely differ from each other in that, in the upper printing arrangement 26, printing cylinder 34 can be retracted upwardly to a slight extent (in a manner not shown), into a position that can be described as a rest position, while the printing cylinder designated as 42 of the lower printing arrangement 28 is pulled downwardly into its rest position. In rest position, the printing cylinders are separated from counter-pressure cylinders 20 and from color application roller 40, while, in the illustrated working position, they are in contact with both. For this reason, it is necessary to provide for two locking mechanisms operating in opposite directions for the working position of the printing cylinder.

FIGS. 2 and 3 illustrate prior art solutions for these locking mechanisms, FIG. 2 showing locking in a pull-back or lower position as the working position, and FIG. 3 showing locking in an upwardly adjusted position.

According to FIG. 2, a shaft 44 which holds printing cylinder 34 is supported in a split bearing jewel 46 the lower plane edge of which, in the indicated working position, abuts a corresponding upper plane surface of bearing block 32. Bearing jewel 46 is connected with a guide bolt 48 adjustable in axial direction in a vertical bore 50 in the bearing jewel. Guide bolt 48, in turn, is connected, by way of a piston rod 52, guided in a bore 54 and sealed with a seal 56, with a displaceable piston which slides within a cylindrical chamber 58 in bearing block 32. Piston 60 carries a rotating seal ring 62. Conduits 64, 66 enter at the axial ends of chamber 58, permitting both sides of piston 60 to be loaded, according to choice, with a pressure fluid, such as an hydraulic oil or compressed air, and thus to displace piston 60 and guide bolt 48 in an axial direction. If the pressure fluid flows in through line 64 and flows out through line 66, bearing jewel 46 is pulled downward (in FIG. 2) and pressed against bearing block 32.

It can be seen that, for example, in the case of thrust forces acting from the right (in FIG. 2) upon printing cylinder 34, and thence, by way of shaft 44, upon bearing jewel 46, such forces can be absorbed by the plane surfaces between bearing jewel 46 and bearing block 32, potentially by friction forces. The lateral support of printing cylinder 34 can therefore essentially take place only via guide bolt 48 and its bore 50.

FIG. 3 shows a common stop for a printing cylinder that can be tensioned upwards, as represented by printing cylinder 42 according to FIG. 1. Insofar as the same parts are presented as in FIG. 1, these will not be further described.

Guide bolt 48 carries on its circumference a ring 68, the upper top surface of which is shaped as an externally truncated cone. This ring 68 is movable within a chamber 70 formed in bearing block 32, during axial displacements of guide bolt 48. The upper side of chamber 70 is limited by an internally truncated cone, the geometry of which corresponds to the externally truncated cone of ring 68. When pressure fluid enters line 66 of chamber 58, the conical surfaces are pressed against each other and the arrangement of FIG. 3 is locked in the position illustrated.

When lateral thrust forces act on printing cylinder 42, these are transferred by way of shaft 44 and the bearing jewel 46 to guide bolt 48 and, thence to the described truncated-cone shaped support surface arrangement. These thrust forces cannot be absorbed by the truncated-cone support surfaces, as can be seen from the geometry shown in FIG. 3, by way of normal forces, so that only frictional forces are available to absorb the thrust forces, creating a sliding movement in the truncated-cone support surfaces, that produces a rotation approximately about the instantaneous center designated as 72 in FIG. 3. The frictional and thrust forces that occur have the disadvantage that they are limited in their magnitude by the friction coefficient and beyond that, as reaction forces, have no readjustment effect, i.e., they are not potential forces. Guide bolt 48 is hence also considerably involved in the absorption of the impact forces, so that the mentioned wear conditions occur.

FIG. 4 shows an embodiment of the invention for a printing cylinder that is pulled downwards into its working position and that is again designated as 34. To the extent that there is congruency with the above-mentioned known solutions, a more specific explanation is necessary. Bearing jewel 46, which holds shaft 44 of printing cylinder 34, is provided, on its lower portion, with two support surfaces 74, 76 which extend in opposite direction at an angle to a plane (not shown) which is perpendicular to the displacement direction of guide bolt 48. The support surfaces are shaped as truncated cones 74, 76, but are not closed into a circle, but are, as shown in FIG. 6, cut off at two opposite sides, into planes that run perpendicular to shaft 44, since no substantial loads occur in the cut-off areas. Opposed to the support surfaces 74, 76 are correspondingly shaped support surfaces 78, 80 on the upper side of bearing block 32; these extend concentrically to bore 50. Below support surfaces 78, 80 there is a ring-shaped recess 82 surrounding concentrically the upper region of bore 50.

In the described arrangement of support surfaces 74, 76, 78 and 80, pure displacement movements can occur only about an instantaneous center located in the intercept of mid-verticals 84 and 86, and designated 88. In the present example, instantaneous center 88 coincides with the geometric axis of shaft 44. Since the central geometric axis of shaft 44 can be considered to be approximately the point of attack of impact forces that have their effect on printing cylinder 34, no kinds of thrust forces occur in the support surfaces in the arrangement as presented, so that the entire impact forces can be absorbed by normal forces in the support surfaces. The impact forces to which printing cylinder 34 is exposed have the potential tendency to lift support surfaces 74, 76 of bearing jewel 46 from support surfaces 78, 80 of bearing block 32 in normal direction. These normal forces, however, can be countered without difficulty by pulling down the bearing jewel 46 with the aid of the above-mentioned pneumatic or hydraulic arrangement, whereby the developed preloading power must in any case exceed the upwardly directed normal forces to be expected in the support surfaces.

It has already been mentioned that the support surfaces need not have the shape presented in FIGS. 4 and 6. They can be occluded truncated cones, truncated pyramids or truncated forms of other polygons, or they can be formed as prisms. Nor need the surface line of a conical surface be straight; it can also be bent, jogged, or the like. It is, however, important that the geometric central axis of shaft 44 be located between the smaller angle formed by the support surfaces, or, to put it another way, that the instantaneous center 88 of a pure thrust movement be located on the same side of the support surfaces as the central axis of shaft 44, as is the case in FIG. 4, in contrast to FIG. 3, insofar as an instantaneous center exists.

FIG. 5 shows a corresponding embodiment for a printing cylinder which is tensioned upward into working position. In this case, bearing block 32 has an upwardly extending neck 88 having on its upper end a flange 90 which juts outwardly, and on the underside of which support surfaces 92, 94 are arranged, their sloped position corresponding essentially to that of the support surfaces of FIG. 4. Bearing jewel 46 has on its outer circumference a downwardly directed, encompassing or divided neck 96, on the lower end of which there is an inwardly directed flange 98. On its upper side, this flange 98 has sloping support surfaces 100, 102 which correspond to support surfaces 92, 94. In the upper working position, shown in FIG. 5, the support surfaces are in pressure contact with each other.

The center verticals 104, 106, again cross at an instantaneous center 108, which, in this case also, coincides with the central geometrical axis of shaft 44. Thus, the conditions are similar to those of the embodiment of FIG. 4.

FIG. 7 shows a further embodiment, representing a variant or supplement to the embodiment of FIG. 4. Bearing jewel 46 is retracted downwardly into the working position by means of guide bolt 48. Bearing block 32 is again provided with upwardly diverging support surfaces 110, 112 facing correspondingly shaped support surfaces 114, 116 on the lower side of bearing jewel 46. The center verticals 118, 130 of these support surfaces cross at an instantaneous center 122 which, in the example shown, is somewhat below the center axis 124 of shaft 44. Adjoining support surfaces 110, 112, 114 and 116, opposed downwardly sloping support surfaces 126, 128, 130 and 132 are arranged on bearing block 32 and bearing jewel 46, so that a gable-shaped or prism-shaped guide is formed. The plan form of these guides can be circular, segmental, polygonal, straight, etc., as described above. The mid-verticals 134, 136 of the last-mentioned support surfaces meet in an instantaneous center 138 which, according to FIG. 7, is below the support surfaces. The considerable distance between instantaneous centers 122 and 138 obviates a rotation about a common instantaneous center, which would correspond to a pure displacement movement in the support surfaces. Thus, a very stable support results.

Figure 8:
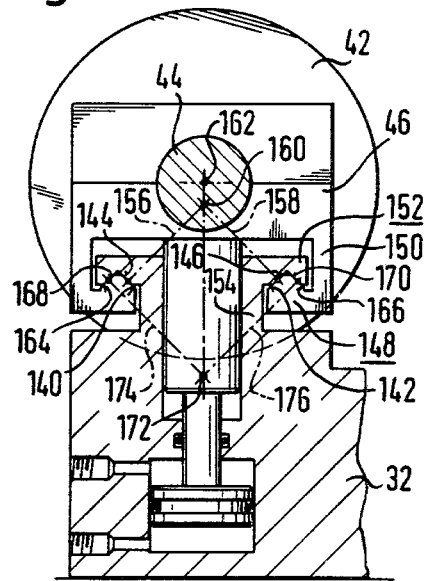
FIG. 8 is a similar embodiment of a printing cylinder that is pushed upward into its working position.

FIG. 8 shows a further variation in the embodiment of FIG. 7 for the case in which shaft 44 is lifted into working position together with printing cylinder 34. Again support surfaces (140, 142, 144, 146) are provided, support surfaces 140, 142 being located on a flange 148 that protrudes inwardly from a neck 150 extending downwardly from bearing jewel 46. This construction generally corresponds to the embodiment of FIG. 5. Support surfaces 144, 146 are located on a flange 152 on the upper end of a neck 154 which extends upwardly from the bearing block 32. Assigned to support surfaces 140, 142, 144, 146 is an instantaneous center 160 as the intercept of mid-verticals 156, 158, located slightly below the center axis 162 of shaft 44, as is also the case in the embodiment of FIG. 7.

Facing support surfaces 140, 142, 144, 146 are further support surfaces 164, 166, 168, 170, which, in combination with the first-mentioned support surfaces, again form a gable-shaped or prism-like guide. The last mentioned support surfaces show, for a pure displacement movement, an instantaneous center 172 as the intercept of mid-verticals 174, 176, this center again being located at a considerable distance from instantaneous center 160.

Figure 9:
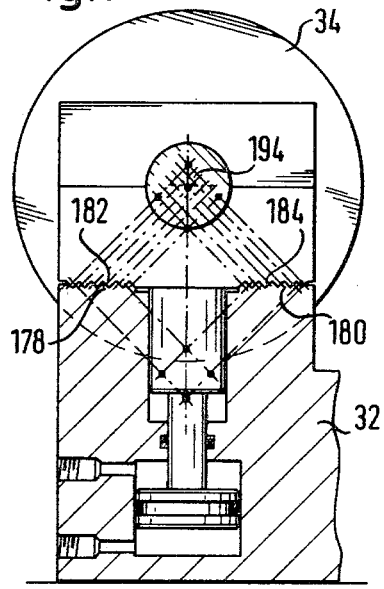
FIG. 9 shows a further embodiment of the invention for a printing cylinder that is pulled downward into its working position.
Figure 10:
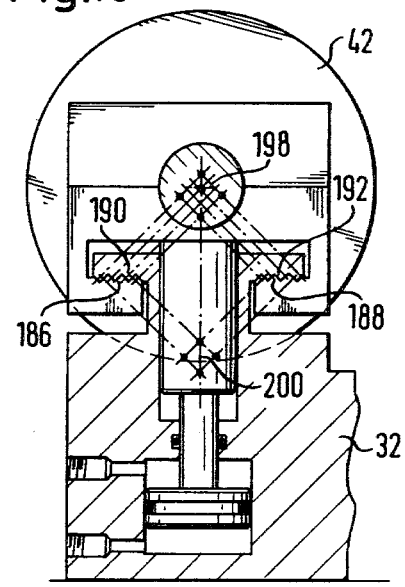
FIG. 10 shows a further embodiment of the invention for a printing cylinder that is pushed upward into its working position.

FIGS. 9 and 10 show variations of the embodiments of FIGS. 7 and 8, differing from the latter in that, instead of simple prism-guides, a sawtooth shaped arrangement of a plurality of prisms is used as support surfaces 178, 180, 182, 184 or 186, 188, 190, 192. This produces scattered fields 194, 196, 198, 200 of instantaneous centers which block a pure displacement movement.

What is claimed is:

1. Means for supporting a shaft having a central axis and subjected to radial impact forces and carrying a member slightly adjustable in a radial direction of said shaft between a working position and a rest position, comprising:
   (a) bearings for supporting said shaft;
   (b) a fixedly arranged bearing block having a bore therein;
   (c) a guide bolt axially displaceable in said bore of said bearing block;
   (d) two bearing jewels each comprising a said bearing and guided in said bore with the aid of said guide bolt;
   (e) two support surfaces for said bearing jewels inclined with respect to a plane perpendicular to the direction of adjustment of said shaft;
   (f) corresponding second support surfaces on said bearing block against which said first support surfaces are pressed when said shaft is in working position;
   (g) said central axis of said shaft being disposed within the smaller of the angles formed by said support surfaces of a said bearing jewel.

2. Means according to claim 1, wherein said central axis of said shaft is located at the intercept of the mid-verticals of said first support surfaces.

3. Means according to claim 1 or 2, comprising opposed inclined support surfaces on said bearing jewel and said bearing block adjacent to said first support surfaces, said inclined support surfaces and said opposed inclined support surfaces jointly forming a prism guide.

4. Means according to claim 3 wherein said support surfaces comprise a plurality of prism guides in a saw-tooth-shaped arrangement.

5. Means according to claim 3, wherein said support surfaces have the shape of truncated cones with a circular cross-section.

6. Means according to claim 5, wherein said truncated cone shaped support surfaces are cut off on at least one of two opposite sides in planes which are perpendicular to said center axis of said shaft.

7. Means according to claim 1, wherein said inclined support surfaces are straight-lined and parallel to said center axis of said shaft.

8. Means according to claim 1, wherein said inclined surfaces are formed in a straight line and inclined with respect to said center axis of said shaft and/or inclined with respect to each other.

9. Means according to claim 1, wherein the contour lines of said support surfaces form a polygon.

10. Means according to claim 9, wherein said polygon is cut off on at least one of two opposing sides in planes that are perpendicular to said center axis of said shaft.

11. Means according to claim 10, comprising a double-acting pressure cylinder having a piston rod, said guide bolt being connected in continuation of its longitudinal axis with said piston rod.

12. Means according to claim 1, wherein said bearing jewel is connected to a biasing means which permits said support surfaces and said second support surfaces to be moved toward each other under pressure.

13. Means according to claim 1, wherein the dip line of said inclined surfaces deviates from a straight line.

14. Means according to claim 13, wherein said dip line is vaulted in the shape of an arch.

* * * * *